United States Patent [19]
Ito

[11] Patent Number: 6,151,453
[45] Date of Patent: Nov. 21, 2000

[54] CAMERA HAVING A GRIP PORTION

[75] Inventor: Toru Ito, Saitama, Japan

[73] Assignee: Fuji Photo Optical Co., Ltd., Saitama, Japan

[21] Appl. No.: 09/273,527

[22] Filed: Mar. 22, 1999

[30] Foreign Application Priority Data

Mar. 31, 1998 [JP] Japan .................................. 10-085755

[51] Int. Cl.⁷ ............................ G03B 15/05; G03B 17/02
[52] U.S. Cl. ............................................ 396/176; 396/539
[58] Field of Search .................................. 396/176, 177, 396/538, 539, 178

[56] References Cited

U.S. PATENT DOCUMENTS

| | | | |
|---|---|---|---|
| 4,896,178 | 1/1990 | Ohmura et al. ........................ | 396/276 |
| 5,655,172 | 8/1997 | Omi et al. ............................. | 396/538 |
| 5,708,896 | 1/1998 | Machida ............................. | 396/176 X |
| 5,754,912 | 5/1998 | Kobayashi ............................. | 396/538 |
| 5,884,112 | 3/1999 | Funahashi et al. ..................... | 396/539 |
| 5,987,268 | 11/1999 | Takahashi et al. ..................... | 396/538 |

FOREIGN PATENT DOCUMENTS 61-278830  12/1986  Japan .
6-301507   10/1994  Japan .

*Primary Examiner*—W. B. Perkey
*Attorney, Agent, or Firm*—Young & Thompson

[57] ABSTRACT

A dry battery having a relatively heavy weight and a main capacitor are held by a holder provided in a grip portion of a camera. Weight of the camera is biased toward the grip portion. When the photographer holds the grip portion, the whole of the camera is stably kept so that camera movement is almost prevented. Thus, when the photograph is taken in a state that the camera is held by a hand, camera movement blur is reduced. A location of the holder is more outer than a film cartridge chamber so that a size from the grip portion to a taking lens becomes larger. A finger holding the camera is prevented from being put on the taking lens. Thus, photographing is prevented from failing, although the whole size of the camera is small.

12 Claims, 8 Drawing Sheets

CAMERA HAVING A GRIP PORTION

BACKGROUND OF THE INVENTION

1. Field of the Invention

The present invention relates to a camera using a photo film cartridge in which a photo film is advanced out of a cartridge body by rotating a spool.

2. Description of the Related Art

In general, when a camera is loaded with a photo film cassette of a conventional 135 type, a rear lid of the camera is opened to bare the whole of a cassette chamber, a film chamber, and a film passage connecting these chambers. The photo film cassette is contained in the cassette chamber, and a photo film is drawn out of the film cassette by a certain amount. Then, the photo film is led from the film passage to the film chamber. After that, the rear lid is closed. In this way, the photo film is contained in the camera.

On the other hand, as to a photo film cartridge used in an Advanced Photo System (hereinafter APS) which is proposed in JPA 6-301157 as a new system, a photo film is advanced out of a cartridge shell by rotating a spool disposed in the cartridge shell. Thus, when the photo film cartridge is inserted into the camera and is removed therefrom, it is possible to treat the film cartridge in a state that the photo film does not come out from the cartridge shell at all.

In such camera loaded with the photo film cartridge of the APS type, the photo film is advanced out of the cartridge shell by rotating the spool so that it is unnecessary to lead the photo film in a condition that the film passage and the film chamber are opened. Upon providing an inserting portion for the film cartridge at the cartridge chamber, the photo film is advanced to the film chamber via the film passage only by rotating the spool.

In the camera loaded with the photo film cartridge of the APS type, instead of the rear lid for opening the whole of the rear face, an opening is provided at a bottom of the camera. Through this opening, the photo film cartridge is inserted into the cartridge chamber in an axial direction. The opening is opened and closed by means of a lid member. The conventional rear lid having been openable is fixed to the rear face of the camera as a part of a wall constituting the film passage and the film chamber. The rear lid does not have an opening/closing mechanism any longer, and merely becomes a rear cover for covering the rear face of the camera.

The above-mentioned camera accommodated to the APS has small size on the whole thereof. Due to the small size, there arises a problem in that when a photograph is taken, a finger of a photographer gripping the camera is sometimes put on a taking lens. At this time, the finger is caused to be photographed. Therefore, improvement has been required. Moreover, weight of the camera is light so that its stability is not good when the photographer grips a grip portion positioned at a side of the camera. According to the insufficient stability at the time of photographing, camera movement blur is sometimes caused.

SUMMARY OF THE INVENTION

In view of the foregoing, it is a primary object of the present invention to provide a camera in which camera movement blur is prevented from occurring.

It is a second object of the present invention to provide a camera in which a finger of a photographer is prevented from being put on a taking lens, and being photographed.

It is a third object of the present invention to provide a camera having small size and light weight.

In order to achieve the above and other objects, the camera according to the present invention comprises a grip portion in which a battery and a main capacitor are contained. The battery is a power source of the camera, and the main capacitor is a part of a flash device. The grip portion is located at a side of the camera, and is held by a photographer to take a photograph.

The camera has a film cartridge chamber for containing a photo film cartridge. The grip portion is located at an outer side of the camera relative to the film cartridge chamber. In other words, a location of the grip portion is more outer than the film cartridge chamber. In this grip portion, the battery and the main capacitor are disposed.

In a preferred embodiment, a holder for holding the battery and the main capacitor is arranged in the grip portion, and is attached to the film cartridge chamber. The battery and the main capacitor are held by the holder in a standing position. In other words, the battery and the main capacitor are disposed in the grip portion so as to be parallel to the height of the camera. By containing the battery and the main capacitor inside the grip portion, weight of the camera is biased toward the grip portion. Thus, when a photographer holds the grip portion, the camera is stably kept so that the camera movement is almost prevented.

The holder of the battery and the main capacitor is positioned at an outer side of the camera relative to the film cartridge chamber so that a size from the grip portion to a taking lens becomes larger. According to this, when the photographer holds the grip portion, a finger of the photographer is hardly put on the taking lens. Thus, the finger is prevented from being photographed.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
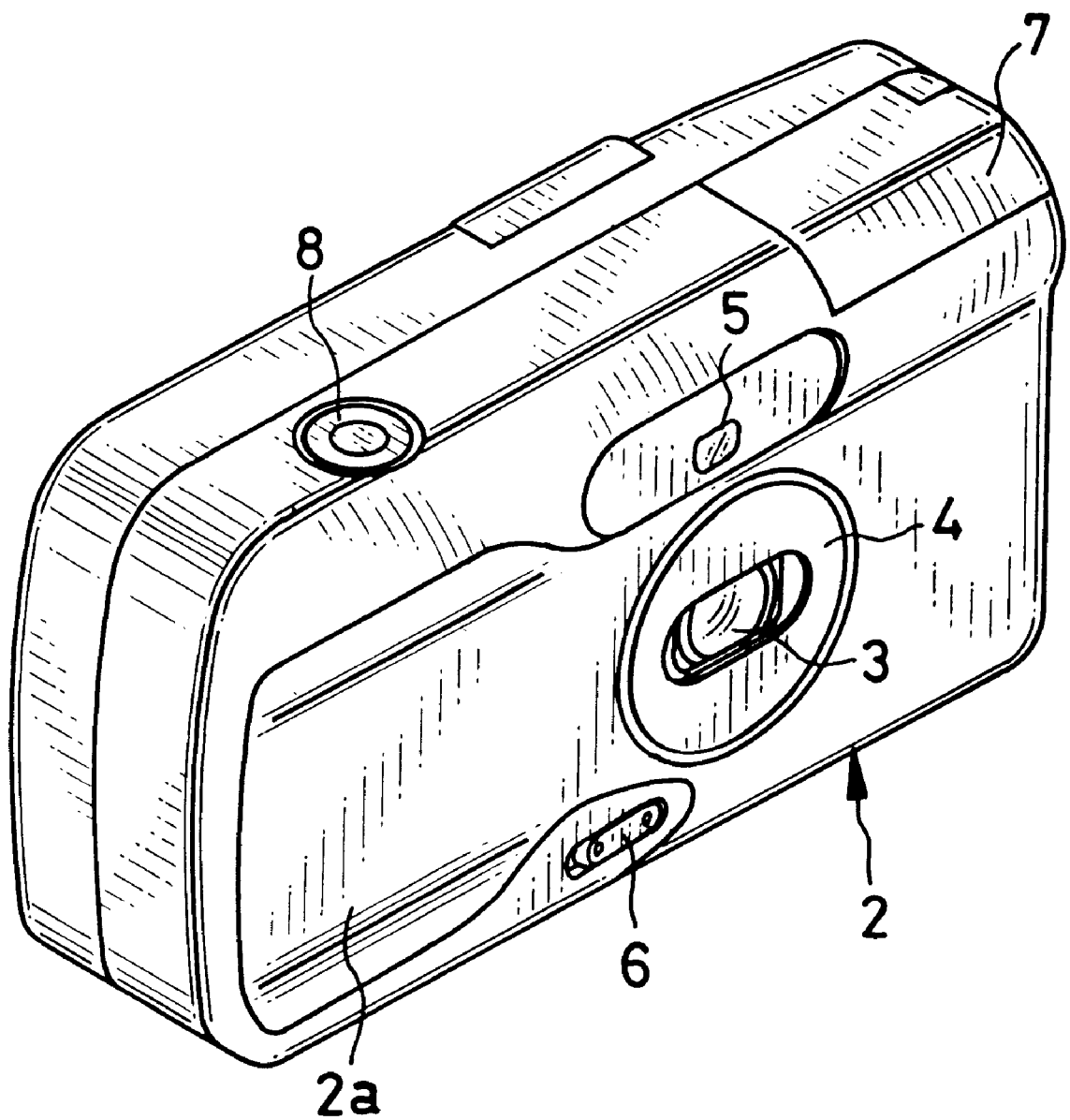
FIG. 2 is a front perspective view of the camera according to the present invention.
Figure 3:
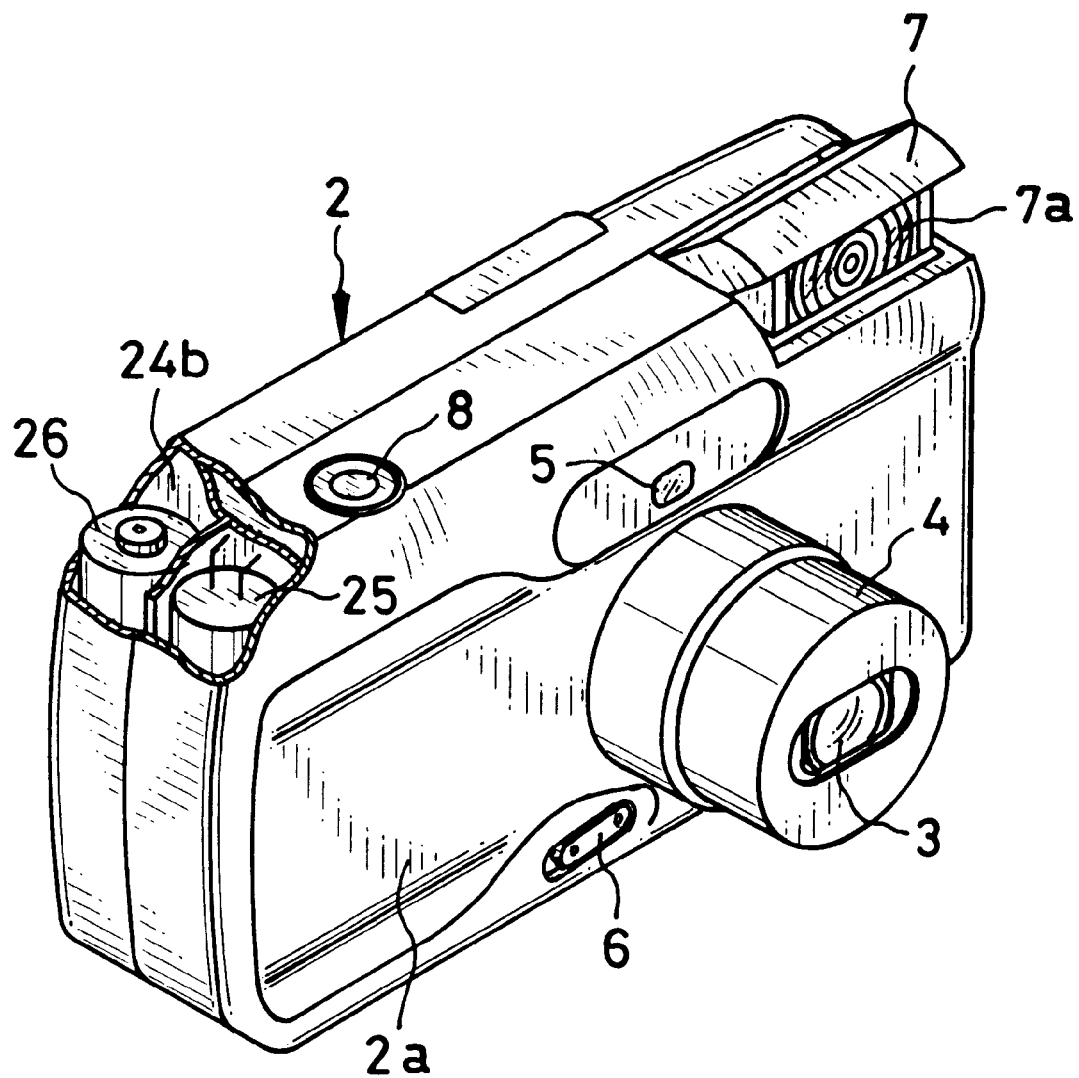
FIG. 3 is a partially cutaway view of the camera according to the present invention.

FIG. 2 is a front perspective view of a camera 2 according to the present invention. The camera 2 is provided with a lens barrel 4 for holding a taking lens 3. The lens barrel 4 is positioned at a right side of a central portion of the camera 2. Further, the lens barrel 4 is adapted to project as shown in FIG. 3. Above the lens barrel 4, a viewfinder 5 for confirming a photographic area is provided. At a left under portion of the lens barrel 4, a main switch 6 for switching a power supply of the camera 2 is provided. The main switch 6 is slidably operated.

An electric flash device 7, which is well known, for emitting a flash light to a subject is provided at a right upper portion of the camera 2. When the main switch 6 is turned on, the flash device 7 is popped up and a light emitting unit 7a emerges as shown in FIG. 3 so that it becomes possible to use the flash device 7. A release button 8 is provided on a left upper face of the camera 2. Upon depressing the release button 8, a shutter device (not shown) is actuated.

Figure 4:
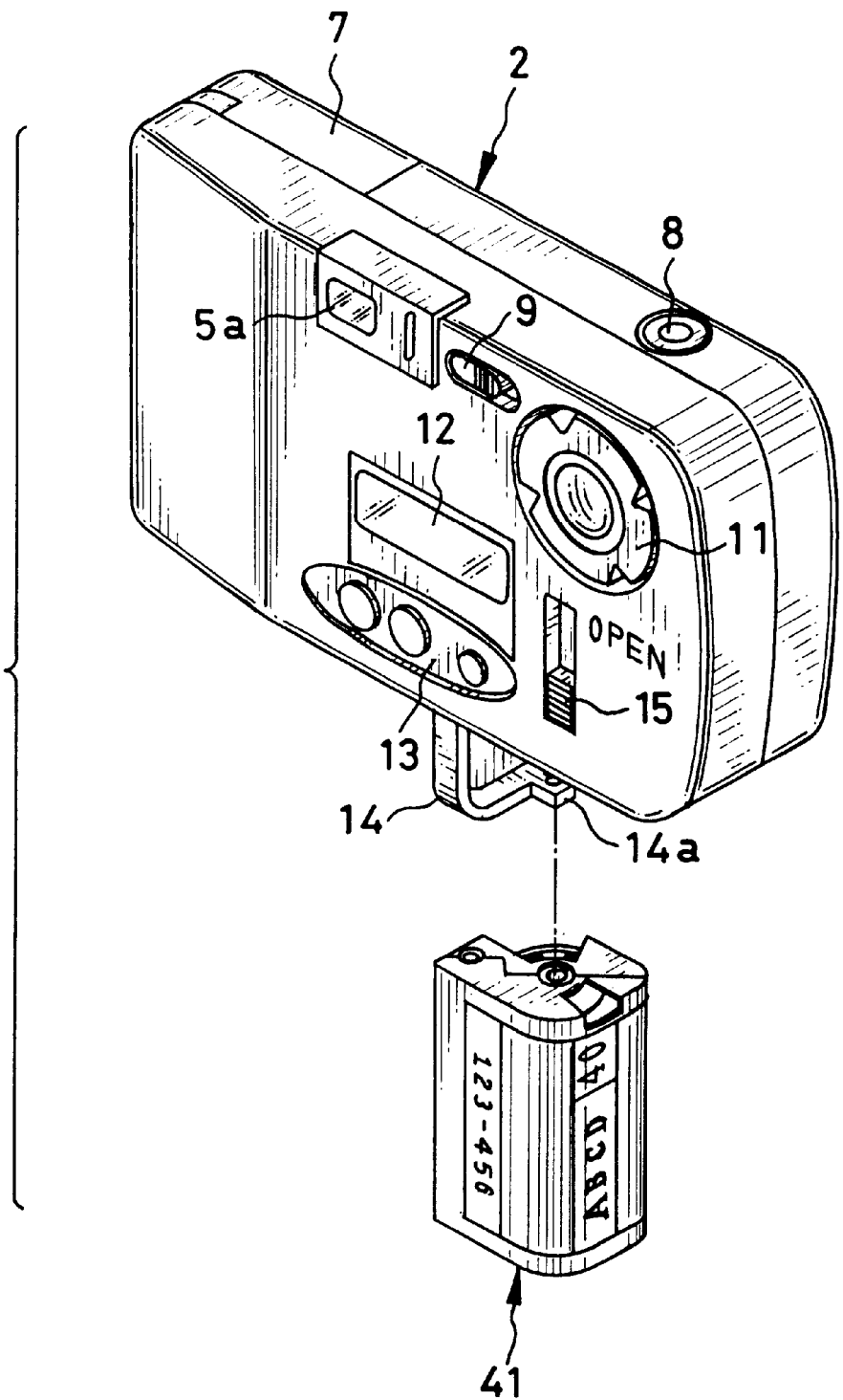
FIG. 4 is a rear perspective view of the camera according to the present invention.

FIG. 4 is a rear perspective view of the camera 2. At a rear upper portion of the camera 2, an eyepiece 5a of the viewfinder 5 is bared. Moreover, near the eyepiece 5a, a print-mode selecting switch 9 is provided. This switch 9 is for selecting a print size, that is, any one of a high-vision size which is a normal size, a panoramic size, and a C size. In accordance with a position of the switch 9, information of the selected print mode is recorded in a magnetic recording layer of a photo film. Recording the information is performed by a magnetic recording device (not shown) of the camera 2.

At the right of the print-mode selecting switch 9, a function selecting switch 11 is provided. This switch 11 is a selection switch for a plurality of functions with respect to photographing. A zoom amount and a flash shot, for example, are set by using the function selecting switch 11. A liquid crystal display 12 is provided at a rear center portion of the camera 2. This liquid crystal display 12 indicates a photographing mode selected by a photographer, a state of an electronic flash, a photographed date, and so forth.

Under the liquid crystal display 12, a date setting unit 13 for operating a date photographing device (not shown) is provided. In accordance with the operation of the date setting unit 13, the photographed date is set and a photographing way of the date is changed.

At the right of the liquid crystal display 12 in FIG. 4, a bottom-lid opening lever 15 for opening a bottom lid 14 is provided. The bottom lid 14 is openably attached to a bottom of the camera 2. The bottom-lid opening lever 15 is an operation member constituting a bottom-lid locking mechanism 17 described later. Moreover, the bottom-lid opening lever 15 is slidable in a height direction of the camera 2.

Figure 5:
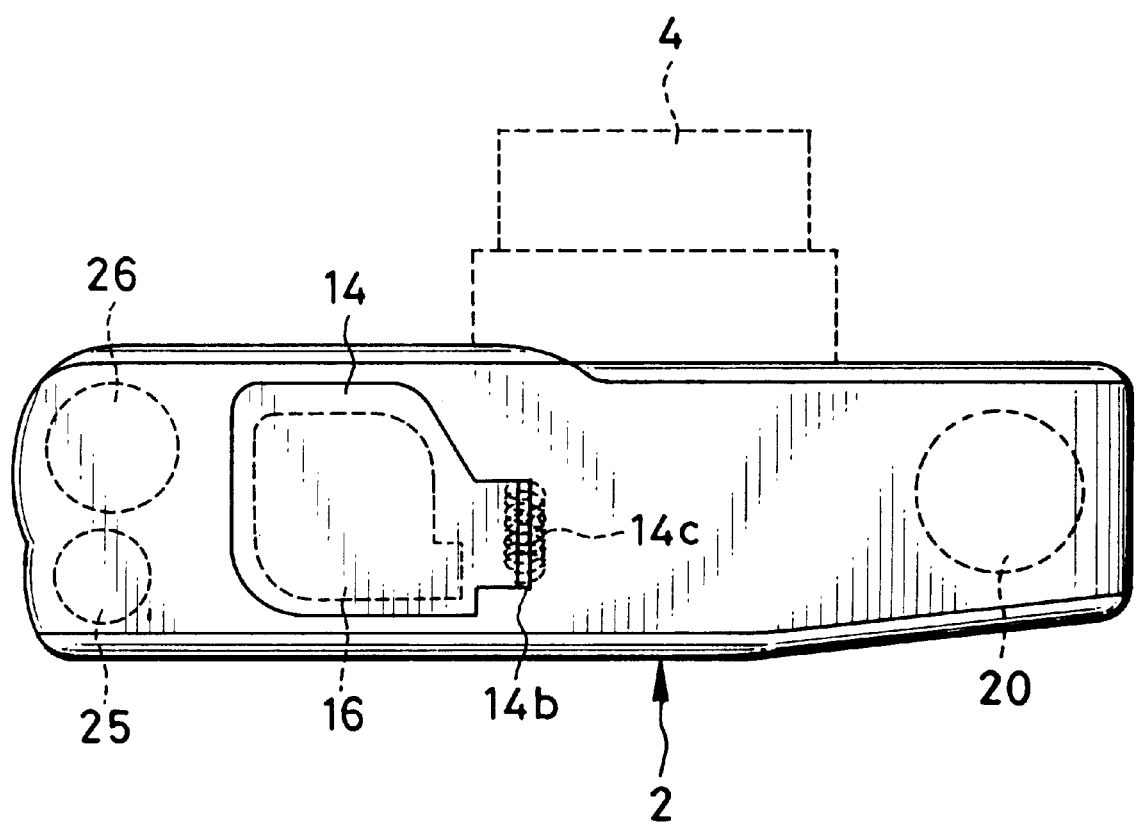
FIG. 5 is a bottom plan view of the camera according to the present invention.

As shown in FIGS. 4 and 5, the bottom lid 14 is openably attached to the bottom of the camera 2. The bottom lid 14 is rotatable around a rotary shaft 14b to which a coiled spring 14c is fixed. The coiled spring urges the bottom lid 14 in an opening direction. A photo film cartridge 41 is inserted into a film cartridge chamber 16 which is covered with the bottom lid 14. The film cartridge chamber 16 is described later in detail. After the bottom lid 14 has been opened by operating the lever 15, the photo film cartridge 41 is inserted into the film cartridge chamber 16. At one end of the bottom lid 14, a projection 14a is integrally formed therewith. The projection 14a engages with a lock claw 21b of the bottom-lid locking mechanism 17 which is described later. On the other hand, the camera 2 is provided with a film take-up chamber 20 having a spool. The photo film advanced from the photo film cartridge 41 is wound on the spool of the film take-up chamber 20 in a roll-like state.

Figure 6:
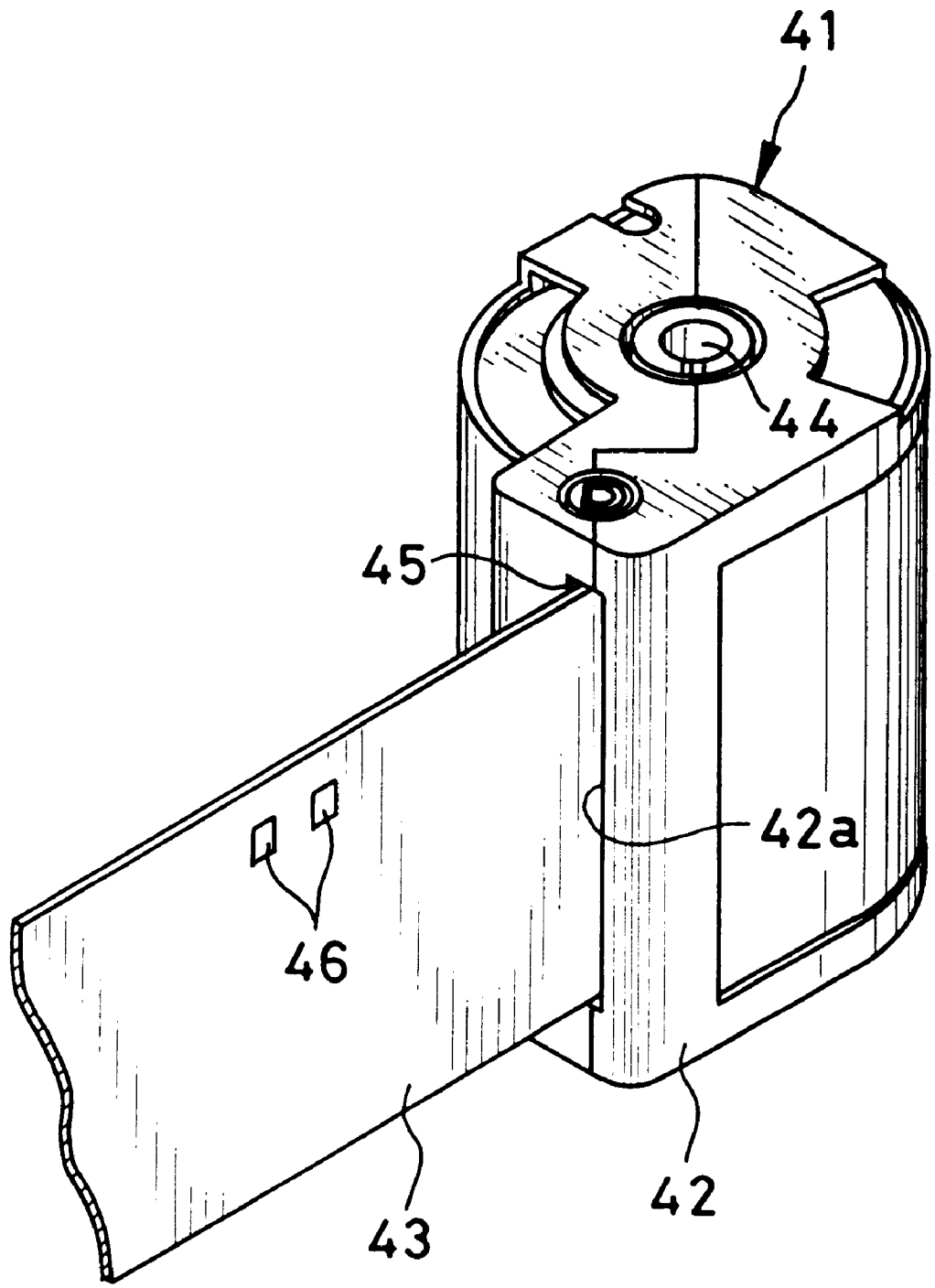
FIG. 6 is an explanatory illustration of a photo film cartridge used in the camera according to the present invention.

The above-mentioned photo film cartridge 41 is accommodated to the well-known Advanced Photo System (APS), and as shown in FIG. 6, the photo film cartridge 41 comprises a cartridge shell 42 and a photo film 43 contained in the cartridge shell 42. A spool 44 is rotatably attached to the inside of the cartridge shell 42. The photo film 43, the end of which is fixed to the spool 44, is wound on the spool 44.

The cartridge shell 42 is formed with a film mouth 42a. A light shielding lid 45 is rotatably attached to the film mouth 42a in order to light-tightly close the film mouth 42a. The photo film 43 is formed with perforations 46 which are provided by two for each frame. By rotating the spool 44, the photo film 43 is advanced through the film mouth 42a.

At a right part of the camera 2, a grip portion 2a gripped by the photographer is formed. Cloth for preventing the camera from slipping is stuck on the front face of the grip portion 2a.

Figure 1:
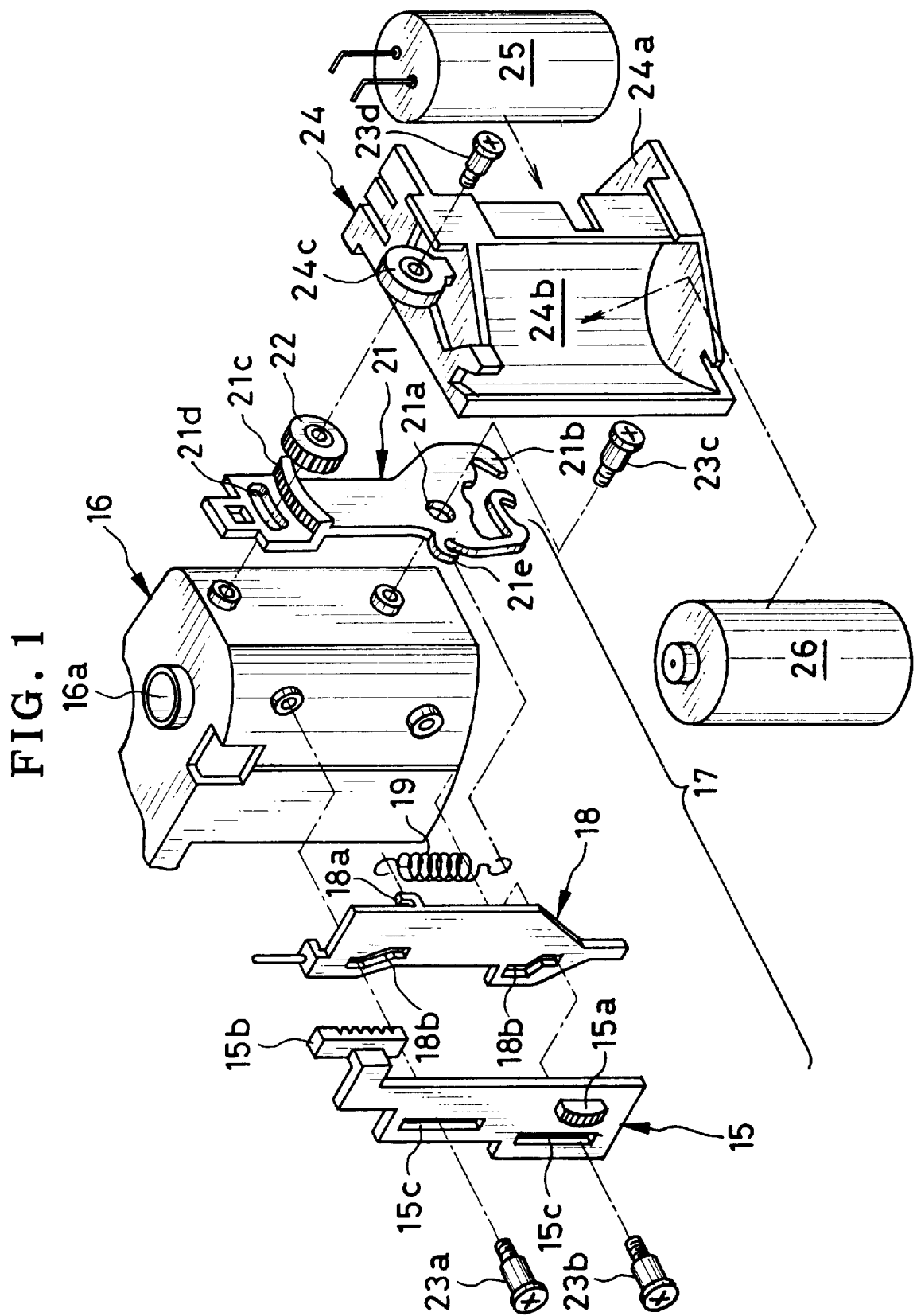
FIG. 1 is an exploded perspective view showing the inside of a camera grip portion according to the present invention.

As shown in FIG. 1, a film cartridge chamber 16 for containing the photo film cartridge 41 is formed inside the camera 2. An upper face of the film cartridge chamber 16 is formed with an opening 16a into which a rotary shaft (not shown) for rotating the spool 44 of the photo film cartridge 41 is inserted.

The bottom-lid locking mechanism 17 is attached to the side of the film cartridge chamber 16. This bottom-lid locking mechanism 17 is constituted of the bottom-lid opening lever 15, an interlocking member 18, a spring 19, a lock member 21, and a pinion gear 22. The bottom-lid opening lever 15 is integrally formed with a knob 15a arranged at a lower portion thereof. Further, a rack gear 15b being linear is provided at an upper portion of the lever 15. At a central portion of the interlocking member 18, an engaging claw 18a for engaging with one end of the spring 19 is integrally formed therewith. The bottom-lid opening lever 15 and the interlocking member 18 are movably attached to the outer face of the film cartridge chamber 16. A moving range of the lever 15 is regulated by slits 15c formed therein and pins 23a, 23b passing through the respective slits 15c. Similarly, a moving range of the interlocking member 18 is regulated by slits 18b formed therein and the pins 23a, 23b passing through the respective slits 18b.

The lock member 21 is rotated around a hole 21a, and is integrally formed with the lock claw 21b positioned at a lower portion thereof. This lock claw 21b engages with the projection 14a of the bottom lid 14. At an upper portion of the lock member 21, a rack gear 21c is formed. The rack gear 21c meshes with the pinion gear 22, and is curved in an arc-like shape. Moreover, an engaging claw 21e for engaging with the other end of the spring 19 is formed. The lock member 21 is attached to the outer face of the film cartridge chamber 16 by means of a pin 23c passing through the hole 21a.

The pinion gear 22 is attached to the outer face of the film cartridge chamber 16 by a pin 23d in a state that teeth of the pinion gear 22 mesh with the rack gear 21c of the lock member 21. Incidentally, the pin 23d is attached so as to pass through a bearing 24c and a slit 21d. The bearing 24c is provided at an upper portion of a holder 24 which is described later, and the slit 21d is formed in the lock member 21.

Figure 7:
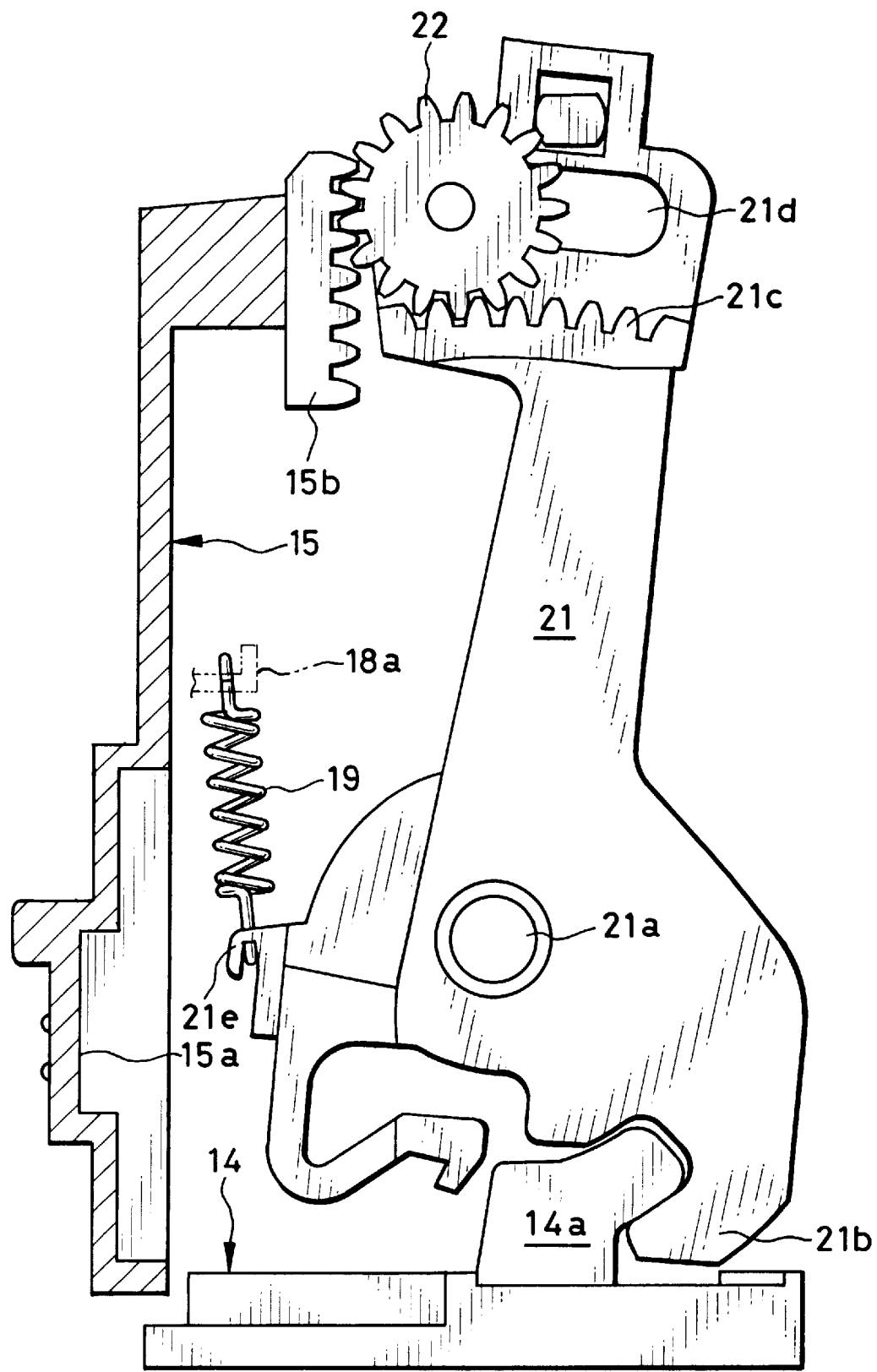
FIG. 7 is an explanatory illustration showing a locked state of a bottom-lid locking mechanism used in the camera according to the present invention.

In the bottom-lid locking mechanism 17 having such structure, as shown in FIG. 7, the lock member 21 is pulled toward the left, around the hole 21a, by means of the spring 19. Incidentally, FIG. 7 shows a state except the time when the photo film cartridge 41 is inserted or removed. At this time, the lock claw 21b positioned at the lower portion of the lock member 21 engages with the projection 14a of the bottom lid 14 so that the bottom lid 14 is retained at the close position.

Figure 8:
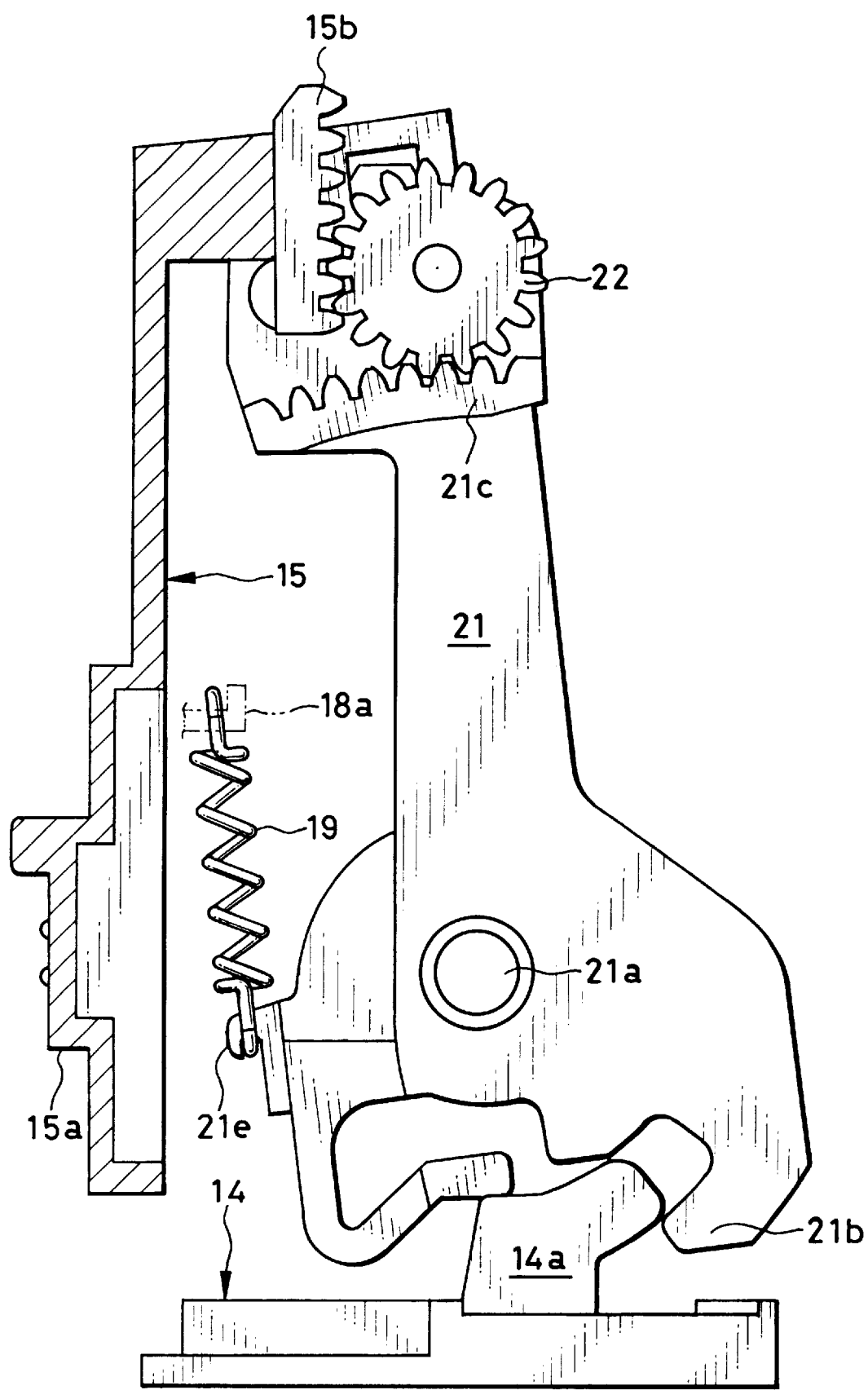
FIG. 8 is an explanatory illustration showing an unlocked state of the bottom-lid locking mechanism.

When the photo film cartridge 41 is inserted or removed, the knob 15a of the bottom-lid opening lever 15 is slid upward as shown in FIG. 8. According to this, the rack gear 15b is also moved upward so that the pinion gear 22 meshing with the rack gear 15b is rotated in the clockwise direction. Further, the rack gear 21c meshing with the pinion gear 22 is moved leftward so that the lock member 21 is rotated, against the spring 19, around the hole 21a in the counterclockwise direction. Thus, the lock claw 21b is released from engagement with the projection 14a of the bottom lid 14, and the bottom lid 14 is opened because it is rotated around the rotary shaft 14b by means of the coiled spring 14c.

The holder 24 is provided at an outer portion relative to the bottom-lid locking mechanism 17 and at the inside of the grip portion 2a. The holder 24 is formed with a capacitor containing section 24a arranged at the front side thereof, and a battery chamber 24b arranged at the rear side thereof. In the capacitor containing section 24a, a main capacitor 25 of the flash device 7 is contained vertically, or on a parallel with the height of the camera 2. In the battery chamber 24b, a dry battery 26 as a power source of the camera 2 is contained vertically, or on a parallel with the height of the camera 2. The battery 26 supplies electric power to the flash device 7.

An operation of the above-described embodiment is explained below. When the camera 2 according to the present invention is used, at the outset, the main switch 6 disposed at the front face of the camera 2 is slid to switch on the power supply. Successively, the camera 2 is turned upside down so as to direct the bottom face thereof upward, and the knob 15a of the bottom-lid opening lever 15 is slid. Then, the rack gear 15b is also moved to rotate the pinion gear 22 meshing with the rack gear 15b so that the lock member 21 is rotated around the hole 21a against the spring 19. Accordingly, the lock claw 21b is released from the engagement with the projection 14a of the bottom lid 14, and the bottom lid 14 is opened because it is rotated around the rotary shaft 14b by means of the coiled spring 14c.

The photo film cartridge 41 is inserted into the film cartridge chamber 16 through the opened bottom lid 14. After that, the bottom lid 14 is rotated to the close position. Since the lock member 21 is pulled around the hole 21a by means of the spring 19, the lock claw 21b of the lock member 21 engages with the projection 14a of the bottom lid 14 to retain the bottom lid 14 at the close position.

After the film cartridge chamber 16 has been loaded with the photo film cartridge 41, the light shielding lid 45 is opened by a device (not shown) for opening/closing the light shielding lid. Successively, the rotary shaft (not shown) which engages with the spool 44 is rotated to advance the photo film 43 through the film mouth 42a.

When the first frame of the photo film 43 is set at the exposure aperture of the camera 2, the liquid crystal display 12 indicates that the camera 2 is photographable. The photographer grips the grip portion 2a. Further, the photographer operates the function selecting switch 11, and adjusts the zoom so as to set the photographing area in the most suitable condition. After that, when the release button 8 is depressed, the shutter device (not shown) is actuated to perform the one-frame photographing. At this time, the information, for example, the date being set at the date setting unit 13 is photographed together with the subject. Moreover, a dot mark corresponding to the print mode selected by the print-mode selecting switch 9 is exposed outside the exposure area of the subject.

The battery 26 having a relatively heavy weight and the main capacitor 25 are disposed in the holder 24 of the grip portion 2a so that weight of the camera 2 is biased toward the grip portion 2a. Therefore, when the photographer grips the grip portion 2a, it is possible to stably keep the whole of the camera without camera movement. Thus, when a photograph is taken in a state that the camera is held by a hand, camera movement blur may be reduced.

The holder 24 including the battery chamber 24b is disposed at the portion being nearer to the side than the film cartridge chamber 16 which is disposed at the side portion of the conventional camera. Accordingly, a size from the grip portion 2a to the lens barrel 4 becomes larger so that it is possible to prevent the finger from being put on the taking lens 3 and to prevent the photograph from failing, although the whole size of the camera 2 is small.

When the final frame of the photo film 43 has been photographed, the rotary shaft (not shown) engaging with the spool 44 is rotated in a film winding direction to wind up the photo film 43 into the cartridge shell 42. After the top end of the photo film 43 has been completely wound up, the device (not shown) for opening/closing the light shielding lid is actuated to close the light shielding lid 45.

When the exposed photo film cartridge 41 is removed, the camera 2 is turned upside down so as to direct the bottom face thereof upward. The knob 15a of the bottom-lid opening lever 15 is slid so that the bottom lid 14 is opened as the lock claw 21b is released from the engagement with the projection 14a of the bottom lid 14. Then, the photo film cartridge 41 is removed from the film cartridge chamber 16.

In the above-described embodiment, the battery and the main capacitor are contained in the standing position. However, any one of the battery and the main capacitor, or both thereof may be disposed in a non-standing position. Moreover, the bottom-lid locking mechanism may be provided at any portion of the camera besides the back thereof, for example, the front, the top and the bottom. On the other hand, the lock of the bottom lid may be released by a rotational operation of the knob. The present invention is applicable to a camera in which a lock releasing mechanism of the bottom lid is provided at the outside relative to the battery and the main capacitor.

In the above-described embodiment, the grip portion contains both of the battery and the main capacitor. However, at least one of the battery and the main capacitor may be contained in the grip portion. In this case, the other one is contained in a front portion of the cartridge chamber, or in a rear portion of the flash device.

As described above, in the camera according to the present invention, the main capacitor and the battery are contained, in the standing position, inside the grip portion for gripping the camera. Therefore, the camera movement blur is almost prevented. Further, according to the present invention, the finger is prevented from being put on the taking lens, though the camera has a small size and light weight.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a cartridge chamber and a film take-up chamber, said cartridge chamber being loaded with a cartridge containing a photo film, and in said film take-up chamber, said photo film advanced from said cartridge being wound in a roll form, said camera comprising:

a battery for supplying electric power;

an electric flash device including a main capacitor, said electric flash device being driven by said battery;

a grip portion disposed more outer than said cartridge chamber, said grip portion being for holding said camera and containing at least one of said battery and said main capacitor, wherein said grip portion contains at least one of said battery and said main capacitor such as to stand in a height direction of said camera;

a bottom lid provided at the bottom of said cartridge chamber, said bottom lid being opened for getting said cartridge in and out, wherein said bottom lid is rotated around a shaft provided on the bottom of said camera; and a bottom-lid locking mechanism for locking said bottom lid in a close condition, said bottom-lid locking mechanism being arranged between said cartridge chamber and a region of said battery and/or said main capacitor contained in said grip portion.

2. A camera according to claim 1, wherein said bottom-lid locking mechanism comprises:

an operation member being movable in a height direction of said camera; and a lock member rotating in association with said operation member, said bottom lid being locked by engagement of said lock member and said bottom lid.

3. A camera according to claim 2, wherein said operation member is disposed on a rear face of said camera.

4. A camera according to claim 2, wherein said lock member has a claw for locking said bottom lid, said claw engaging with a projection provided on said bottom lid to lock said bottom lid.

5. A camera according to claim 4, wherein said operation member is provided with a first rack gear, and said lock member is provided with a second rack gear.

6. A camera according to claim 5, wherein said bottom-lid locking mechanism further comprises:

a pinion gear for meshing with said first rack gear and said second rack gear, movement of said operation member being transported to said lock member via said pinion gear.

7. A camera according to claim 5, wherein said bottom-lid locking mechanism comprises:

an operation member being movable in a height direction of said camera; and a lock member rotating in association with said operation member, said bottom lid being locked by engagement of said lock member and said bottom lid.

8. A camera having a cartridge chamber and a film take-up chamber, said cartridge chamber being loaded with a cartridge containing a photo film, and in said film take-up chamber, said photo film advanced from said cartridge being wound in a roll-like state, said camera comprising:

a grip portion disposed more outer than said cartridge chamber, and for holding said camera;

a battery chamber arranged in said grip portion, and for containing a battery;

a bottom lid provided at the bottom of said cartridge chamber, and opened for getting said cartridge in and out; and a bottom-lid locking mechanism for locking said bottom lid in a close condition, said bottom-lid locking mechanism being arranged between said cartridge chamber and said battery chamber.

9. A camera according to claim 7, wherein said operation member is disposed on a rear face of said camera.

10. A camera according to claim 7, wherein said lock member has a claw for locking said bottom lid, said claw engaging with a projection provided on said bottom lid to lock said bottom lid.

11. A camera according to claim 10, wherein said operation member is provided with a first rack gear, and said lock member is provided with a second rack gear.

12. A camera according to claim 11, wherein said bottom-lid locking mechanism further comprises:

a pinion gear for meshing with said first rack gear and said second rack gear, movement of said operation member being transported to said lock member via said pinion gear.

* * * * *